(12) United States Patent
Nishide et al.

(10) Patent No.: US 12,438,197 B2
(45) Date of Patent: Oct. 7, 2025

(54) NON-AQUEOUS ELECTROLYTE SOLUTION SECONDARY BATTERY AND MANUFACTURING METHOD OF NON-AQUEOUS ELECTROLYTE SOLUTION SECONDARY BATTERY

(71) Applicant: Prime Planet Energy & Solutions, Inc., Tokyo (JP)

(72) Inventors: Daisuke Nishide, Kobe (JP); Azusa Nakanishi, Toyota (JP); Hideki Sano, Ikeda (JP); Naoto Onodera, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 569 days.

(21) Appl. No.: 17/702,722

(22) Filed: Mar. 23, 2022

(65) Prior Publication Data
US 2022/0320594 A1 Oct. 6, 2022

(30) Foreign Application Priority Data
Mar. 30, 2021 (JP) ................................. 2021-057179

(51) Int. Cl.
*H01M 10/0587* (2010.01)
*H01M 4/04* (2006.01)
*H01M 10/0525* (2010.01)

(52) U.S. Cl.
CPC ..... *H01M 10/0587* (2013.01); *H01M 4/0447* (2013.01); *H01M 10/0525* (2013.01)

(58) Field of Classification Search
CPC ........... H01M 10/0587; H01M 4/0447; H01M 10/0525; H01M 10/0431; H01M 10/446; H01M 50/103; Y02E 60/10; Y02P 70/50
See application file for complete search history.

(56) References Cited

U.S. PATENT DOCUMENTS

| 6,376,121 B1 | 4/2002 | Inomata et al. |
| 2002/0006540 A1 | 1/2002 | Enomoto et al. |

(Continued)

FOREIGN PATENT DOCUMENTS

| CN | 103201894 A | 7/2013 |
| CN | 104067411 A | 9/2014 |

(Continued)

OTHER PUBLICATIONS

Office Action in U.S. Appl. No. 17/826,166, mailed Apr. 22, 2025, 20pp.

(Continued)

*Primary Examiner* — Daniel S Gatewood
(74) *Attorney, Agent, or Firm* — HAUPTMAN HAM, LLP (57) ABSTRACT

Provided is a technique for preventing plastic deformation of a battery case due to restraint during initial charging. A manufacturing method disclosed herein is a manufacturing method of a non-aqueous electrolyte solution secondary battery. This method includes assembling to construct a secondary battery assembly, and initial charging of the secondary battery assembly. In the initial charging, the initial charging is started with the secondary battery assembly restrained or not restrained; when a negative electrode potential of the secondary battery assembly reaches 0.6 V, a restraint force P1 is applied to the secondary battery assembly, wherein the restraint force P1 is greater than a restraint force applied before the negative electrode potential reaches 0.6 V; and the restraint force P1 is applied to the secondary battery assembly until the negative electrode potential reaches at least 0.3 V.

15 Claims, 7 Drawing Sheets

(56) References Cited

U.S. PATENT DOCUMENTS

| | | | |
|---|---|---|---|
| 2002/0034678 A1 | 3/2002 | Shibuya et al. | |
| 2002/0055047 A1 | 5/2002 | Satoh et al. | |
| 2005/0221187 A1 | 10/2005 | Inagaki et al. | |
| 2009/0239133 A1 | 9/2009 | Kosugi | |
| 2013/0232773 A1* | 9/2013 | Mineya | H01M 50/46 29/623.5 |
| 2014/0377607 A1 | 12/2014 | Urano | |
| 2015/0194640 A1* | 7/2015 | Tsukuda | H01M 10/0468 429/185 |
| 2015/0244032 A1 | 8/2015 | Yamamoto et al. | |
| 2016/0099481 A1 | 4/2016 | Akagawa et al. | |
| 2016/0380299 A1 | 12/2016 | Umeyama et al. | |
| 2017/0263979 A1 | 9/2017 | Hanazaki | |
| 2017/0346138 A1 | 11/2017 | Umeyama et al. | |
| 2018/0034097 A1 | 2/2018 | Uwai et al. | |
| 2020/0161698 A1 | 5/2020 | Higuchi | |
| 2020/0266493 A1* | 8/2020 | Toi | H01M 4/668 |
| 2021/0066764 A1 | 3/2021 | Ikeda | |
| 2021/0135320 A1 | 5/2021 | Murata et al. | |
| 2021/0184267 A1 | 6/2021 | Tanaka et al. | |

FOREIGN PATENT DOCUMENTS

| | | | |
|---|---|---|---|
| CN | 105164847 A | | 12/2015 |
| CN | 106299444 A | | 1/2017 |
| CN | 112335116 A | | 2/2021 |
| JP | H06-084545 A | | 3/1994 |
| JP | H8293320 A | | 11/1996 |
| JP | 2001-283914 A | | 10/2001 |
| JP | 2007-005069 A | | 1/2007 |
| JP | 2008-226625 A | | 9/2008 |
| JP | 201021104 A | | 1/2010 |
| JP | 2010-528404 A | | 8/2010 |
| JP | 2011-082093 A | | 4/2011 |
| JP | 201284346 A | | 4/2012 |
| JP | 2013125650 A | * | 6/2013 |
| JP | 2013-182712 A | | 9/2013 |
| JP | 2015-099725 A | | 5/2015 |
| JP | 2015-162261 A | | 9/2015 |
| JP | 2015-176771 A | | 10/2015 |
| JP | 2015228289 A | * | 12/2015 |
| JP | 201929097 A | | 2/2019 |
| KR | 2002-0002200 A | | 1/2002 |
| KR | 10-2017-0035565 A | | 3/2017 |
| KR | 10-2021-0027111 A | | 3/2021 |
| WO | 2008/100090 A1 | | 8/2008 |
| WO | 2015/136937 A1 | | 9/2015 |
| WO | 2016/132444 A1 | | 8/2016 |
| WO | 2019044560 A1 | | 3/2019 |
| WO | 2020/059131 A1 | | 3/2020 |

OTHER PUBLICATIONS

Merriam Webster Definition of "Strip" noun, Accessed Apr. 9, 2025, 1pp.

Daojun Yang et al., Effect of moisture content on the electrochemical performance of LiNi1/3Co1/3Mn1/3O2/ graphite battery, Electrochimica Acta, vol. 188, 2016, pp. 611-618, ISSN 0013-4686, http://doi.org/10.1016/j.electacta.2015.12.063 (Year: 2016), 8pp.

Machine Translation Relied Upon for Application JP-2013125650-A (Year: 2013), 26pp.

Office Action in U.S. Appl. No. 17/826,166, mailed Aug. 26, 2025, 34pp.

\* cited by examiner

NON-AQUEOUS ELECTROLYTE SOLUTION SECONDARY BATTERY AND MANUFACTURING METHOD OF NON-AQUEOUS ELECTROLYTE SOLUTION SECONDARY BATTERY

CROSS REFERENCE TO RELATED APPLICATIONS

This application claims priority on the basis of Japanese Patent Application No. 2021-057179 filed on Mar. 30, 2021, and the entire contents of this application are incorporated in the present specification by reference.

BACKGROUND OF THE DISCLOSURE

1. Technical Field

The present invention relates to a non-aqueous electrolyte solution secondary battery and a manufacturing method of a non-aqueous electrolyte solution secondary battery.

2. Background

Currently, secondary batteries such as lithium ion secondary batteries are widely used in various fields such as vehicles and mobile terminals. Typical examples of this kind of secondary battery include a non-aqueous electrolyte solution secondary battery including an electrode body having a positive electrode plate and a negative electrode plate, a non-aqueous electrolyte solution, and a battery case accommodating the electrode body and the non-aqueous electrolyte solution.

In manufacturing of a non-aqueous electrolyte solution secondary battery, initial charging is generally performed on a secondary battery assembly in a state where an electrode body and a non-aqueous electrolyte solution are accommodated in a battery case. By performing initial charging, a so-called SEI coating can be formed on the surface of a negative electrode plate. Meanwhile, during initial charging, gas derived from components contained in the secondary battery assembly may be generated in electrode body. In this regard, WO 2019/044560 proposes a manufacturing method of a secondary battery, the method including installing a secondary battery precursor upright so that the secondary battery precursor has an opening portion at the highest position in a vertical direction, and performing initial charging while allowing generated gas to escape from the opening portion.

Furthermore, as the electrode body provided in the non-aqueous electrolyte solution secondary battery as described above, a flat-shaped wound electrode body, in which a band-shaped positive electrode plate and a band-shaped negative electrode plate are wound with a band-shaped separator interposed therebetween, may be adopted. In this regard, Japanese Patent Application Publication No. 2010-21104 proposes carrying out a charging step, an aging step, and the like in a state where the wound electrode body as described above is put in a rectangular parallelepiped-shaped battery case having a pair of wide surfaces, and the battery case is pressed from both sides of the pair of wide surfaces. It is disclosed that this can prevent the influence of gas generation.

SUMMARY OF THE INVENTION

Meanwhile, regarding the secondary battery assembly having the flat-shaped wound electrode body, when the secondary battery assembly is restrained during initial charging in order to prevent gas retention in the electrode body, there is a concern of plastic deformation of the battery case. Therefore, it is still required to devise a method for preventing plastic deformation of the battery case in order to perform restraint during initial charging.

The present invention has been made to solve such a problem, and an object of the present invention is to provide a technique for preventing plastic deformation of a battery case due to restraint during initial charging.

The inventors of the present invention have focused on the swelling of a wound electrode body due to gas generation during initial charging, and the reduction of space in a battery case (space between the wound electrode body and the inner wall of the case) accompanying the swelling. That is, there is space in the battery case because the wound electrode body does not swell before the start of initial charging. When a secondary battery assembly is restrained in this state, restrained surfaces (for example, a pair of wide surfaces) of the battery case are likely to be dented inward, and non-restrained surfaces (for example, a bottom surface and other side surfaces) of the battery case are likely to swell. Meanwhile, when the wound electrode body swells due to gas generation and the space becomes smaller, plastic deformation of the battery case due to restraint is less likely to occur. In addition, the inventors of the present invention thought to change a restraint force applied to the secondary battery assembly according to a gas generation state in the wound electrode body during initial charging. In addition, as a result of diligent studies by the inventors of the present invention, they have found that gas is generated when a negative electrode potential is within a predetermined range, and thus completed the present invention.

A manufacturing method disclosed herein is a manufacturing method of a non-aqueous electrolyte solution secondary battery that has a flat-shaped wound electrode body in which a band-shaped positive electrode plate and a band-shaped negative electrode plate are wound with a band-shaped separator interposed therebetween, a non-aqueous electrolyte solution, and a battery case accommodating the wound electrode body and the non-aqueous electrolyte solution. This manufacturing method includes: assembling in which the wound electrode body and the non-aqueous electrolyte solution are accommodated in the battery case to construct a secondary battery assembly; and initial charging in which initial charging of the secondary battery assembly is performed. In the initial charging, the initial charging is started with the secondary battery assembly restrained or not restrained in a thickness direction of the wound electrode body, and when a negative electrode potential of the secondary battery assembly reaches 0.6 V, a restraint force P1 is applied to the secondary battery assembly, wherein the restraint force P1 is greater than a restraint force before the negative electrode potential reaches 0.6 V, and the restraint force P1 is applied to the secondary battery assembly until the negative electrode potential reaches at least 0.3 V. The negative electrode potential herein is a negative electrode potential with respect to a lithium metal reference (vs. Li/Li$^+$).

In the manufacturing method having the above-mentioned constitution, when the negative electrode potential is within a predetermined range (that is, in a period during which gas is generated in the wound electrode body), a larger restraint force is applied to the secondary battery assembly, which makes it possible to prevent plastic deformation of the battery case. In addition, gas retention in the wound electrode body can be prevented by restraining it.

In a suitable embodiment of the manufacturing method disclosed herein, the restraint force P1 is 3 kN or more and 15 kN or less. When the restraint force P1 is within the above-mentioned range, the effect of the technique disclosed herein can be appropriately exerted.

In another suitable embodiment of the manufacturing method disclosed herein, in the initial charging, a restraint force P2 is applied to the secondary battery assembly, when the negative electrode potential reaches 0.3 V. A ratio (P2/P1) of the restraint force P1 and the restraint force P2 is 0.8 or more and 1.2 or less. The studies by the inventors of the present invention showed that, when the negative electrode potential reaches 0.3 V, gas generation is reduced, and the degree of swelling of the wound electrode body due to the gas generation is reduced. Therefore, by applying the restraint force P2 satisfying the above-mentioned range, gas retention in the wound electrode body can be prevented while plastic deformation of the battery case during initial charging is prevented.

In still another suitable embodiment of the manufacturing method disclosed herein, both ends of the wound electrode body in the thickness direction are constituted of a wide planar portion. The planar portion has a center portion including a center line in a winding axial direction of the wound electrode body, and two end portions sandwiching the center portion in the same direction. In the initial charging, a restraint force is applied to the center portion and a restraint force is not applied to the two end portions. Gas is likely to be retained in the center portion of the wound electrode body. Therefore, gas retention can be more effectively prevented by selectively applying a restraint force to the portion.

In still another suitable embodiment of the manufacturing method disclosed herein, the negative electrode plate has a negative electrode core, and a negative electrode active material layer formed on the negative electrode core. A length of the negative electrode active material layer in the winding axial direction of the wound electrode body is at least 20 cm. The technique disclosed herein is suitably used for manufacturing the non-aqueous electrolyte solution secondary battery having such a wound electrode body.

In still another suitable embodiment of the manufacturing method disclosed herein, an adhesive layer is provided on at least one surface of the separator, and the adhesive layer is adhered to the positive electrode plate or the negative electrode plate. When the separator having the adhesive layer is used, an interelectrode distance between the positive electrode plate and the negative electrode plate can be reduced. Therefore, a restraint force during initial charging can be reduced, and plastic deformation of the battery case can be more effectively prevented.

In still another suitable embodiment of the manufacturing method disclosed herein, the battery case has an exterior body having an opening and a bottom portion facing the opening, and a sealing plate for sealing the opening. The wound electrode body is disposed inside the exterior body, wherein the winding axis is parallel to the bottom portion. According to such a configuration, gas can more easily escape from the wound electrode body, which makes it possible to more effectively prevent gas retention in the wound electrode body.

In still another suitable embodiment of the manufacturing method disclosed herein, the battery case (for example, the exterior body) has a pair of large-area side walls facing each other, and a pair of small-area side walls facing each other and having an area smaller than an area of the large-area side walls. A distance between the pair of large-area side walls is at least 3 cm. A plurality of the wound electrode bodies are accommodated in the battery case. With such a configuration, the effect of the technique disclosed herein can be more effectively realized. In addition, when the non-aqueous electrolyte solution secondary battery has a plurality of wound electrode bodies, energy can be more efficiently obtained from the secondary battery.

By using the manufacturing method disclosed herein, the non-aqueous electrolyte solution secondary battery having the following configuration can be manufactured. The non-aqueous electrolyte solution secondary battery has a positive electrode current collector and a negative electrode current collector which are electrically connected to the wound electrode body, and a positive electrode tab group having a plurality of tabs protruding from one end portion in the winding axial direction of the wound electrode body, and a negative electrode tab group having a plurality of tabs protruding from the other end in the same direction. The positive electrode current collector and the positive electrode tab group are connected, and the negative electrode current collector and the negative electrode tab group are connected.

According to the technique disclosed herein, a non-aqueous electrolyte solution secondary battery is provided, the non-aqueous electrolyte solution secondary battery including: a flat-shaped wound electrode body in which a band-shaped positive electrode plate and a band-shaped negative electrode plate are wound with a band-shaped separator interposed therebetween; a non-aqueous electrolyte solution; and a battery case accommodating the wound electrode body and the non-aqueous electrolyte solution. The negative electrode plate has a negative electrode core, and a negative electrode active material layer formed on the negative electrode core. A length of the negative electrode active material layer in a winding axial direction of the wound electrode body is at least 20 cm. The negative electrode plate has a plurality of tabs protruding from one end portion in the winding axial direction. In the tab closest to a winding start end portion in the negative electrode plate, when one end portion of a base of the tab in a direction orthogonal to the winding axis is defined as an end portion B, the other end portion on an opposite side to the end portion B of the base is defined as an end portion C, a midpoint of a line segment BC linking the end portion B and the end portion C is defined as a midpoint E, and a straight line passing through the midpoint E and along the winding axis is defined as a straight line A, and when the following three points (1) to (3) are present on the straight line A: (1) a center of the negative electrode active material layer in the winding axial direction, (2) a point separated from the center toward the tab by 5 mm or more and 15 mm or less, and (3) a point separated from the center toward a side opposite to the tab by 5 mm or more and 15 mm or less, an intensity of phosphorus (P) at the point (1) is equal to or less than an intensity of phosphorus (P) at the point (2) and is equal to or less than an intensity of phosphorus (P) at the point (3), wherein phosphorus (P) contained in the negative electrode active material layer, which is collected from the above three points, is detected by laser ablation ICP mass spectrometry.

In the non-aqueous electrolyte solution secondary battery having the above-mentioned configuration, plastic deformation of the battery case is prevented. In addition, occurrence of coating formation unevenness on the negative electrode plate is prevented. Therefore, deterioration in battery performance is prevented.

A preferred embodiment of the non-aqueous electrolyte solution secondary battery disclosed herein is characterized in that, when the intensity of phosphorus (P) at the point (1) is $I_1$, the intensity of phosphorus (P) at the point (2) is $I_2$, and the intensity of phosphorus (P) at the point (3) is $I_3$, a ratio $(I_2/I_1)$ of $I_1$ and $I_2$ and a ratio $(I_3/I_1)$ of $I_1$ and $I_3$ are both 1 or more and 2.5 or less. In the non-aqueous electrolyte solution secondary battery, the condition in which the ratio $(I_2/I_1)$ and the ratio $(I_3/I_1)$ satisfy the above-mentioned range is realized regarding the intensities of phosphorus (P) at the points (1) to (3).

According to the technique disclosed herein, a non-aqueous electrolyte solution secondary battery is further provided, the non-aqueous electrolyte solution secondary battery including: a flat-shaped wound electrode body in which a band-shaped positive electrode plate and a band-shaped negative electrode plate are wound with a band-shaped separator interposed therebetween; a non-aqueous electrolyte solution; and a battery case accommodating the wound electrode body and the non-aqueous electrolyte solution. The negative electrode plate has a negative electrode core, and a negative electrode active material layer formed on the negative electrode core. A length of the negative electrode active material layer in a winding axial direction of the wound electrode body is at least 20 cm. The negative electrode plate has a plurality of tabs protruding from one end portion in the winding axial direction. In the tab closest to a winding start end portion in the negative electrode plate, when one end portion of a base of the tab in a direction orthogonal to the winding axis is defined as an end portion B, the other end portion on an opposite side to the end portion B of the base is defined as an end portion C, a midpoint of a line segment BC linking the end portion B and the end portion C is defined as a midpoint E, and a straight line passing through the midpoint E and along the winding axis is defined as a straight line A, and when the following three points (1), (4), and (5) are present on the straight line A:

(1) a center of the negative electrode active material layer in the winding axial direction, (4) a point separated from the center toward the tab by 10 mm or more and 20 mm or less, and (5) a point separated from the center toward a side opposite to the tab by 10 mm or more and 20 mm or less, an intensity of phosphorus (P) at the point (1) is equal to or less than an intensity of phosphorus (P) at the point (4) and is equal to or less than an intensity of phosphorus (P) at the point (5), wherein phosphorus (P) contained in the negative electrode active material layer which is collected from the above three points, is detected by laser ablation ICP mass spectrometry.

In the non-aqueous electrolyte solution secondary battery having the above-mentioned configuration, plastic deformation of the battery case is prevented. In addition, occurrence of coating formation unevenness on the negative electrode plate is prevented. Therefore, deterioration in battery performance is prevented.

A preferred embodiment of the non-aqueous electrolyte solution secondary battery disclosed herein is characterized in that, when the intensity of phosphorus (P) at the point (1) is $I_1$, the intensity of phosphorus (P) at the point (4) is $I_4$, and the intensity of phosphorus (P) at the point (5) is $I_5$, a ratio $(I_4/I_1)$ of $I_1$ and $I_4$ and a ratio $(I_5/I_1)$ of $I_1$ and $I_5$ are both 1 or more and 2.7 or less. In the non-aqueous electrolyte solution secondary battery, the condition in which the ratio $(I_4/I_1)$ and the ratio $(I_5/I_1)$ satisfy the above-mentioned range is realized regarding the intensities of phosphorus (P) at the points (1), (4), and (5).

DETAILED DESCRIPTION OF THE PREFERRED EMBODIMENTS

Hereinafter, some suitable embodiments of the technique disclosed herein will be described with reference to the drawings. Matters other than those specifically mentioned in the present specification and required for carrying out the present invention (for example, general configurations and manufacturing processes of secondary batteries that are not characteristic of the technique disclosed herein) can be understood as design matters by those skilled in the art based on the related art in the field. The technique disclosed herein can be carried out based on the content disclosed in the present specification and the common technical knowledge in the field.

In the present specification, "secondary battery" is a term referring to a general power storage device capable of repeatedly charging and discharging, and the concept includes a so-called storage battery (chemical battery) such as a lithium ion secondary battery and a capacitor (physical battery) such as an electric double layer capacitor. "Active material" in the present specification refers to a material capable of reversibly occluding and discharging charge carriers (for example, lithium ions). "Level of charge" in the present specification refers to a charge rate (charge amount from initial state/battery capacity of secondary battery assembly×100) with a fully charged state of a secondary battery assembly (non-aqueous electrolyte solution secondary battery) as 100%, and is also referred to as state of charge (SOC).

In the drawings referred to in the present specification, reference numeral X indicates a "depth direction," reference numeral Y indicates a "width direction," and reference numeral Z indicates a "height direction." Furthermore, in the depth direction X, F indicates "front" and Rr indicates "rear." In the width direction Y, L indicates "left" and R indicates "right." In addition, in the height direction Z, U indicates "up" and D indicates "down." However, these are merely directions for convenience of explanation, and do not limit installation aspects of a secondary battery in any way. Furthermore, in the present specification, the notation "A to B" indicating a numerical value range includes not only the meaning of "A or more and B or less" but also the meaning of "more than A and less than B."

First Embodiment

Figure 1:
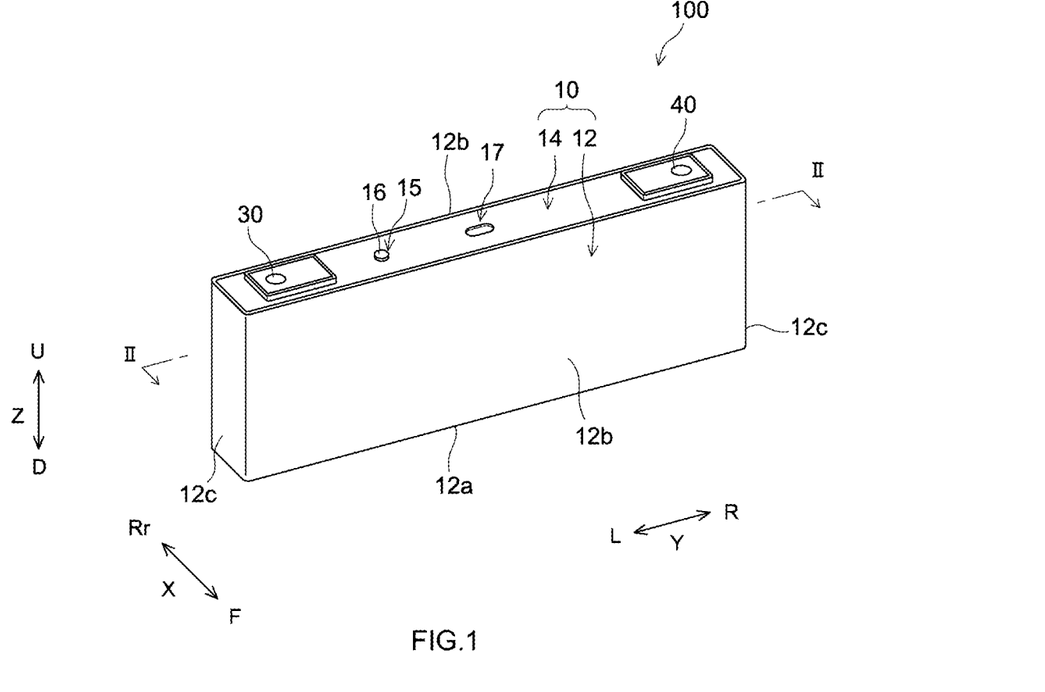
FIG. 1 is a perspective view schematically showing a non-aqueous electrolyte solution secondary battery manufactured by a manufacturing method according to a first embodiment.
Figure 2:
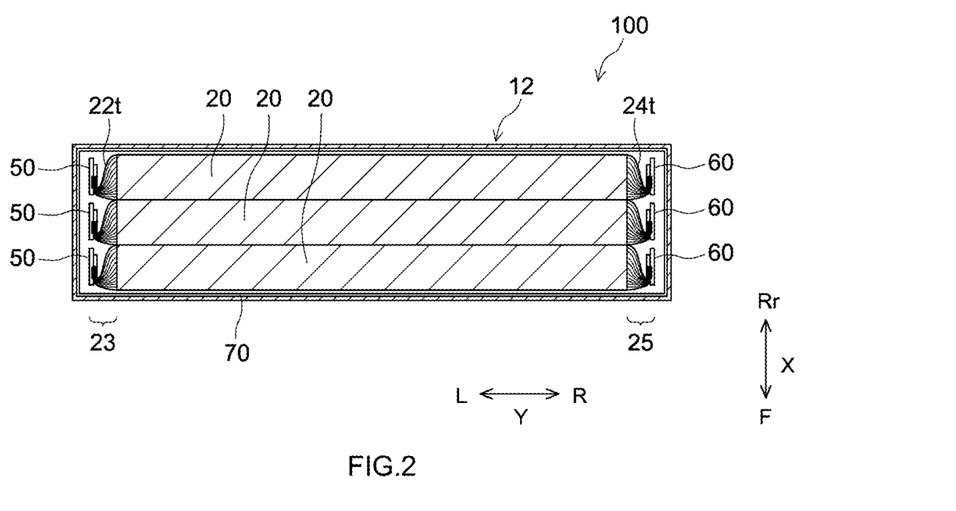
FIG. 2 is a schematic transverse sectional view along a line II-II of FIG. 1.

An example of a non-aqueous electrolyte solution secondary battery manufactured by a manufacturing method disclosed herein is shown in FIGS. 1 and 2. A non-aqueous electrolyte solution secondary battery 100 includes a wound electrode body 20, a non-aqueous electrolyte solution not shown in the drawings, and a battery case 10 accommodating the wound electrode body and the non-aqueous electrolyte solution. The non-aqueous electrolyte solution secondary battery 100 is a lithium ion secondary battery.

The non-aqueous electrolyte solution may contain a non-aqueous solvent and a supporting salt. As the non-aqueous solvent, organic solvents such as various carbonates used in a general lithium ion secondary battery can be used without particular limitation. Specific examples thereof include linear carbonates such as dimethyl carbonate (DMC), ethyl methyl carbonate (EMC), and diethyl carbonate (DEC); cyclic carbonates such as ethylene carbonate (EC), propylene carbonate (PC), butylene carbonate (BC), methylethylene carbonate, and ethylethylene carbonate; fluorinated linear carbonates such as methyl 2,2,2-trifluoroethyl carbonate (MTFEC); and fluorinated cyclic carbonates such as monofluoroethylene carbonate (FEC) and difluoroethylene carbonate (DFEC). For such a non-aqueous solvent, one kind can be used alone, or two or more kinds can be used in combination. The non-aqueous solvent is preferably a cyclic carbonate. Among them, ethylene carbonate (EC) can be preferably used.

Examples of the supporting salt include $LiPF_6$. The concentration of the supporting salt in the non-aqueous electrolyte solution may be set within the range of 0.7 mol/L to 1.3 mol/L. The non-aqueous electrolyte solution may contain coating-forming agents such as an oxalate complex compound containing a boron (B) atom and/or a phosphorus (P) atom (for example, lithium bis(oxalato)borate (LiBOB)), vinylene carbonate (VC), and lithium difluorophosphate; and gas-generating agents such as biphenyl (BP) and cyclohexylbenzene (CHB), for example, as components other than the above-mentioned components. In addition, conventionally known additives such as thickeners, dispersants, and the like may be contained as long as the effect of the technique disclosed herein is not significantly impaired. The coating-forming agent is preferably an oxalate complex compound or lithium difluorophosphate.

The battery case 10 has an exterior body 12 having an opening, and a sealing plate (lid body) 14 for sealing the opening. The battery case 10 is integrated and airtightly sealed (hermetically closed) by joining the sealing plate 14 to the peripheral edge of the opening of the exterior body 12. The exterior body 12 is a bottomed and square tube-shaped polygon exterior body having the opening, a rectangular bottom portion 12a facing the opening, a pair of large-area side walls 12b rising from the long side of the bottom portion 12a, and a pair of small-area side walls 12c rising from the short side of the bottom portion 12a. The small-area side wall 12c has an area smaller than the area of the large-area side wall 12b. The sealing plate 14 is provided with a liquid injection hole 15 for the non-aqueous electrolyte solution, a gas exhaust valve 17, a positive electrode terminal 30, and a negative electrode terminal 40. The liquid injection hole 15 is sealed with a sealing member 16. The positive electrode terminal 30 and the negative electrode terminal 40 are electrically connected to the wound electrode body 20 accommodated in the battery case 10. The battery case 10 is made of a metal, for example. Examples of the metal material constituting the battery case 10 include aluminum, aluminum alloys, iron, and iron alloys.

The size of the battery case 10 is not particularly limited. As will be described later, when a plurality of wound electrode bodies 20 are accommodated in the exterior body 12 in some embodiments, the distance between the pair of large-area side walls 12b may be appropriately set according to the number, size, and the like of the accommodated wound electrode bodies 20. The above-mentioned distance may be at least 3 cm, may be 3 cm or longer, may be 4 cm or longer, or may be 5 cm or longer, for example. Furthermore, the above-mentioned distance may be 10 cm or shorter, may be 8 cm or shorter, or may be 6 cm or shorter, for example.

The wound electrode body 20 is a power generation element of the non-aqueous electrolyte solution secondary battery 100, and has a positive electrode plate, a negative electrode plate, and a separator. In the present embodiment, as shown in FIG. 2, a plurality of the wound electrode bodies 20 (for example, two or more, three or more, or four or more, and three in FIG. 2) are accommodated in the battery case 10 (exterior body 12) in a state where the plurality of the wound electrode bodies 20 are arranged the depth direction X. As shown in FIGS. 1 to 4, the wound electrode body 20 is disposed in the inner side of the exterior body 12 in a direction in which a winding axis WL is parallel to the bottom portion 12a. The wound electrode body 20 is accommodated in the battery case 10 in a state in which it is accommodated in an electrode body holder 70. As the constituent material of each of the members (the positive electrode plate, the negative electrode plate, the separator, and the like) constituting the wound electrode body 20, any material that may be used in a general non-aqueous electrolyte solution secondary battery can be used without particular limitation, and because the constituent material thereof does not limit the technique disclosed herein, detailed description thereof is omitted.

A length L1 of the wound electrode body 20 in a winding axis WL direction is at least 20 cm, and may be set to 20 cm or longer, 25 cm or longer, or 30 cm or longer, for example. Furthermore, the above-mentioned length L1 may be 60 cm or shorter, 50 cm or shorter, or 40 cm or shorter, for example. The above-mentioned length L1 does not include both the length of a positive electrode tab 22t and the length of a negative electrode tab 24t, which will be described later.

Figure 3:
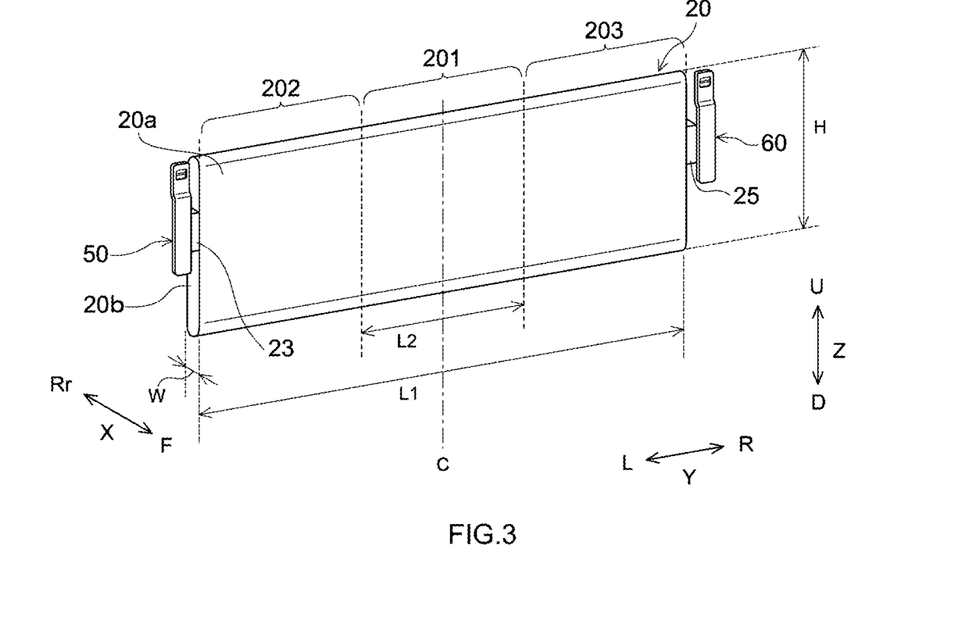
FIG. 3 is a perspective view schematically showing a wound electrode body used in the manufacturing method according to the first embodiment.
Figure 4:
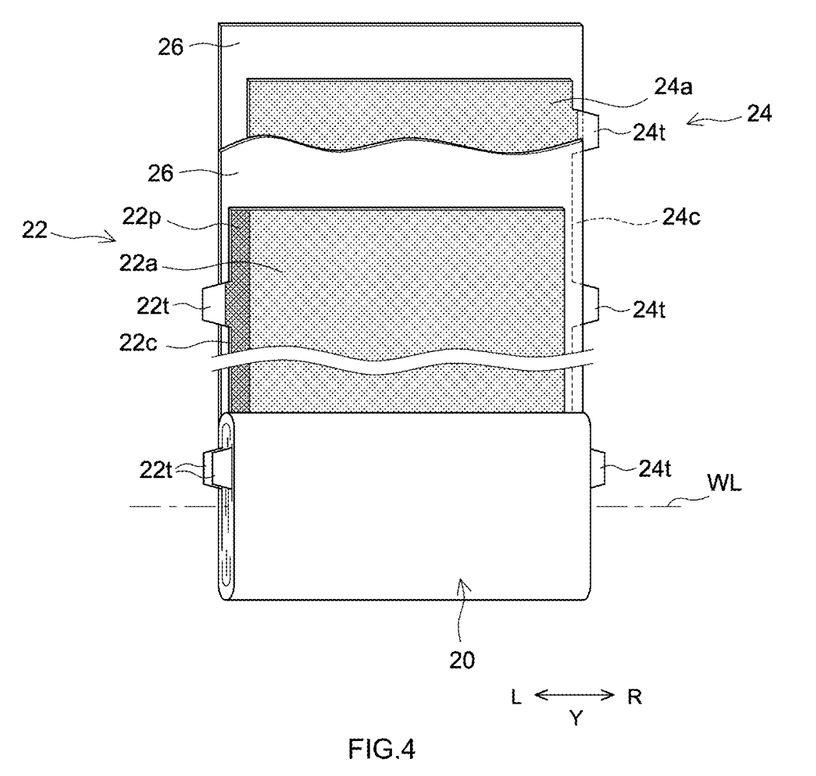
FIG. 4 is a schematic view showing the configuration of the wound electrode body used in the manufacturing method according to the first embodiment.

As shown in FIG. 4, the wound electrode body 20 has a positive electrode plate 22 and a negative electrode plate 24. Here, the wound electrode body 20 is a flat-shaped wound electrode body in which the long band-shaped positive electrode plate 22 and the long band-shaped negative electrode plate 24 are wound around the winding axis WL that is orthogonal to a longitudinal direction and with a long band-shaped separator 26 interposed therebetween. As shown in FIG. 3, both ends of the wound electrode body 20 in the width direction Y are constituted of the positive electrode plate 22, the negative electrode plate 24, and a laminated surface 20b of the separator 26. The laminated surface 20b is open to the outside of the wound electrode body 20.

Both ends of the wound electrode body 20 in a thickness direction (depth direction X) are constituted of a wide planar portion 20a. The planar portion 20a has a center portion 201 including a center line C of the planar portion 20a in a winding axial direction of the wound electrode body 20, and two end portions 202 and 203 sandwiching the center portion 201 in the same direction. Because gas generated in the wound electrode body 20 is discharged to the outside of the wound electrode body via the laminated surface 20b, the gas is likely to be retained in the center portion 201. A ratio (L2/L1) of the length L1 of the planar portion 20a and a length L2 of the center portion 201 in the winding axial direction may be ⅙ or more or ¼ or more, and ½ or less or ⅓ or less, for example. When the phrase "including a center line C" is used, it is sufficient for the center line C to be included in the center portion 201, and for example, the distance between a center line of the center portion 201 and the center line C is equal to or shorter than ¼ of L2. The lengths of the end portions 202 and 203 in the winding axial direction may be appropriately set according to the above-mentioned length L2.

The positive electrode plate 22 has a long band-shaped positive electrode core 22c, and a positive electrode active material layer 22a which is fixed on at least one surface (preferably both surfaces) of the positive electrode core 22c (for example, aluminum foil, aluminum alloy foil, or the like) and contains a positive electrode active material (for example, a lithium nickel cobalt manganese composite oxide (NCM) or the like). Although not particularly limited, a positive electrode protective layer 22p may be provided on one side edge portion in the width direction Y of the positive electrode plate 22 as necessary. A plurality of positive electrode tabs 22t are provided at one end portion (the left end portion in FIG. 4) in the width direction Y of the positive electrode core 22c. Each of the plurality of positive electrode tabs 22t protrudes toward one side (the left side in FIG. 4) in the width direction Y. The plurality of positive electrode tabs 22t are provided at intervals (intermittently) in a longitudinal direction of the positive electrode plate 22. The positive electrode tab 22t is a part of the positive electrode core 22c, and is a portion (core exposed portion) of the positive electrode core 22c in which the positive electrode active material layer 22a and the positive electrode protective layer 22p are not formed. The plurality of positive electrode tabs 22t are stacked at one end portion (the left end portion in FIG. 4) in the width direction Y to constitute a positive electrode tab group 23 having the plurality of positive electrode tabs 22t. A positive electrode current collector 50 is joined to the positive electrode tab group 23 (refer to FIGS. 2 to 4).

The size of the positive electrode plate 22 may be set to realize the above-mentioned length L1 of the wound electrode body 20. The length of the positive electrode plate 22 in the winding axis WL direction may be set to 20 cm or longer, 25 cm or longer, or 30 cm or longer, for example. Furthermore, the length may be 60 cm or shorter, 50 cm or shorter, or 40 cm or shorter, for example. The above-mentioned length does not include the length of the positive electrode tab 22t.

The negative electrode plate 24 has a long band-shaped negative electrode core 24c (for example, copper foil, copper alloy foil, or the like), and a negative electrode active material layer 24a which is fixed on at least one surface (preferably both surfaces) of the negative electrode core 24c and contains a negative electrode active material (for example, graphite or the like). A plurality of negative electrode tabs 24t are provided at one end portion (the right end portion in FIG. 4) in the width direction Y of the negative electrode core 24c. The plurality of negative electrode tabs 24t protrude toward one side (the right side in FIG. 4) in the width direction Y. The plurality of negative electrode tabs 24t are provided at intervals (intermittently) in a longitudinal direction of the negative electrode plate 24. Here, the negative electrode tab 24t is a part of the negative electrode core 24c, and is a portion (core exposed portion) of the negative electrode core 24c in which the negative electrode active material layer 24a is not formed. The plurality of negative electrode tabs 24t are stacked at one end portion (the right end portion in FIG. 4) in the width direction Y to constitute a negative electrode tab group 25 having the plurality of negative electrode tabs 24t. A negative electrode current collector 60 is joined to the negative electrode tab group 25 (refer to FIGS. 2 to 4).

The size of the negative electrode plate 24 may be set to realize the above-mentioned length L1 of the wound electrode body 20. The length of the negative electrode plate 24 (for example, the length of the negative electrode active material layer 24a) in the winding axis WL direction is at least 20 cm, and may be set to 20 cm or longer, 25 cm or longer, or 30 cm or longer, for example. Furthermore, the length may be 60 cm or shorter, 50 cm or shorter, or 40 cm or shorter, for example. The above-mentioned length does not include the length of the negative electrode tab 24t.

As the separator 26, a separator formed of a conventionally known microporous sheet can be used without particular limitation. Examples thereof include a porous sheet (film, non-woven fabric, and the like) made of a polyolefin resin such as polyethylene (PE) or polypropylene (PP). An adhesive layer may be provided on at least one surface of the separator 26. By providing the adhesive layer, the positive electrode plate 22 and the negative electrode plate 24 can be closely attached to the separator 26. Therefore, an interelectrode distance between the positive electrode plate 22 and the negative electrode plate 24 can be made small, and positional deviations thereof can be prevented. The constituent material of the adhesive layer is not particularly limited as long as it is a resin material having appropriate adhesiveness, but it may be a resin material such as a fluorine resin, an acrylic resin, a polyamide resin, a polyimide resin, or a polyurethane resin, for example.

Figure 5:
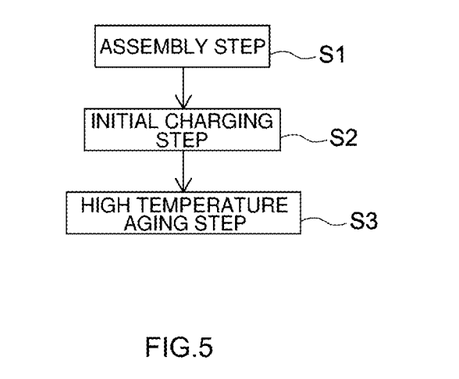
FIG. 5 is a process chart of the manufacturing method according to the first embodiment.

As shown in FIG. 5, the manufacturing method disclosed herein includes an assembly step S1, an initial charging step S2, and a high temperature aging step S3. In the assembly step S1, wound electrode bodies and a non-aqueous electrolyte solution are accommodated in a battery case to construct a secondary battery assembly. First, the wound electrode bodies 20 are produced by a conventionally known method using the above-mentioned materials. Next, the positive electrode current collector 50 is attached to the positive electrode tab group 23 of the wound electrode body 20, and the negative electrode current collector 60 is further attached to the negative electrode tab group 25 to prepare a combined product (first combined product) of the wound electrode body and the electrode current collectors (refer to FIG. 3). In the present embodiment, three first combined products are prepared.

Next, the three first combined products and the sealing plate 14 are integrated to prepare a second combined product. Specifically, for example, the positive electrode terminal 30 previously attached to the sealing plate 14, and the positive electrode current collectors 50 of the first combined products are joined to each other. Similarly, the negative electrode terminal 40 previously attached to the sealing plate 14, and the negative electrode current collectors 60 of the first combined products are joined to each other. As joining means, ultrasonic joining, resistance welding, laser welding, and the like can be used, for example.

Next, the second combined product is accommodated in the exterior body 12. Specifically, for example, the three wound electrode bodies 20 are accommodated in the electrode body holder 70 produced by bending an insulating resin sheet (made of polyolefin such as polyethylene (PE), for example) into a bag shape or a box shape. Then, the wound electrode bodies 20 covered with the electrode body holder 70 are inserted into the exterior body 12. In this state, the sealing plate 14 is superposed on the opening of the exterior body 12, and the exterior body 12 and the sealing plate 14 are welded to each other to seal the exterior body 12. Then, the non-aqueous electrolyte solution is injected into the battery case 10 through the liquid injection hole 15 by a conventionally known method. The wound electrode bodies 20 are impregnated with the injected non-aqueous electrolyte solution. In this manner, the secondary battery assembly in which the wound electrode bodies 20 and the non-aqueous electrolyte solution are accommodated in the battery case 10 is constructed.

Figure 6:
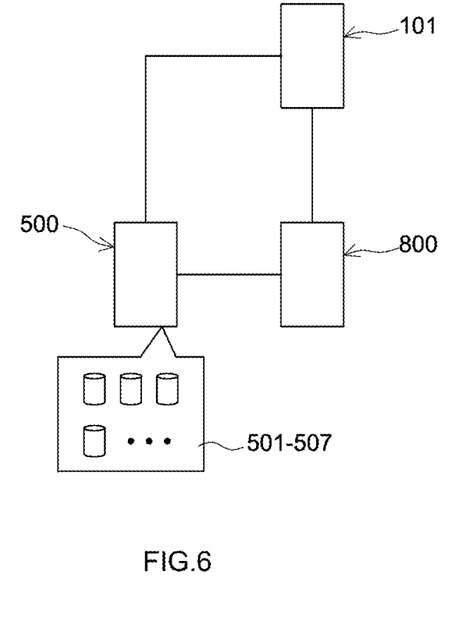
FIG. 6 is a block diagram for explaining control of an initial charging process in the manufacturing method according to the first embodiment.
Figure 7:
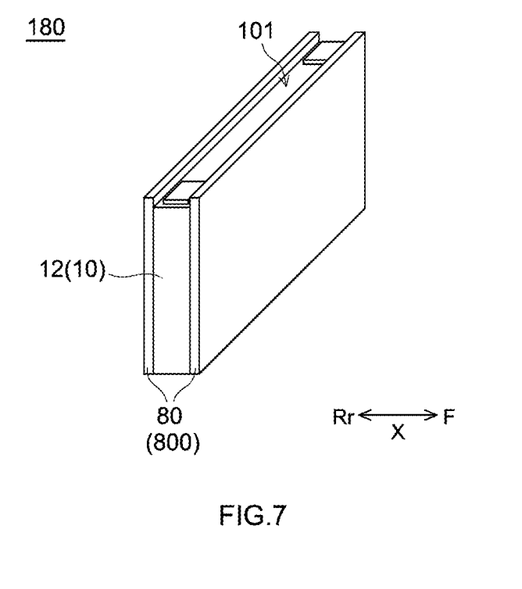
FIG. 7 is a perspective view for explaining a restrained state of a secondary battery assembly in the manufacturing method according to the first embodiment.

In the initial charging step S2, initial charging is performed on the secondary battery assembly. The present step includes controlling restraint of the secondary battery assembly in a predetermined aspect. As shown in FIG. 6, restraint of a secondary battery assembly 101 by a restraint jig 800 is controlled by a control apparatus 500. The kind of the restraint jig 800 is not particularly limited, but for example, it is possible to use the restraint jig 800 having a pair of flat plates 80 for restraint as shown in FIG. 7 and restraint members (for example, springs, bolts, belts, and the like) (not shown). Although not particularly limited, for example, an elastic body such as a spring is installed on the flat plates 80 for restraint to change the distance between the pair of the flat plates 80 for restraint by the elastic force of the elastic body, and thereby a restraint force can be applied to the secondary battery assembly 101. Alternatively, the pair of the flat plates 80 for restraint may be bridged to each other with a belt or the like. Restraining may be performed in a state where a plurality of restraint bodies 180 are arranged in the depth direction X.

The control apparatus 500 is configured to evaluate the charge state of the secondary battery assembly 101 and control restraint of the secondary battery assembly 101 by the restraint jig 800 based on the evaluation. The control apparatus 500 includes a CPU that executes a processing program, a ROM that stores the processing program, a RAM that temporarily stores data, an input and output port and a communication port, and various sensors. Each configuration and processing of the control apparatus 500 may be embodied as a part of or as a database that stores data embodied by a computer in a predetermined format, a data structure, a processing module that performs predetermined computing processing according to a predetermined program, or the like. The processing of the control apparatus 500 may be performed in cooperation with such an external computer. For example, information or some pieces of information stored in the control apparatus 500 may be stored in an external computer, or the processing or a part of the processing executed by the control apparatus 500 may be executed by an external computer.

The control apparatus 500 includes a detection unit, a map information storage unit, a storage unit, a battery information acquisition unit, a negative electrode potential estimation unit, and a control unit, for example, as functional blocks for evaluating the charge state of the secondary battery assembly 101 and controlling restraint of the secondary battery assembly 101 by the restraint jig 800 based on this evaluation.

The detection unit is configured to be able to detect the current value (Ib) and the voltage value (Vb) of the secondary battery assembly 101, and may include a current detection unit 501 and a voltage detection unit 502. The current detection unit 501 is connected to an ammeter (not shown) connected in series with the secondary battery assembly 101 to detect the current value (Ib). The voltage detection unit 502 is connected to a voltmeter (not shown) connected in parallel with the secondary battery assembly 101 to detect the voltage value (Vb).

A map information storage unit 503 stores a negative electrode potential estimation map configured such that a negative electrode potential can be estimated based on the voltage value (Vb) of the secondary battery assembly 101. In the negative electrode potential estimation map, the correlation between the battery voltage of the secondary battery assembly 101 and the negative electrode potential is recorded. In the present specification, the "negative electrode potential" refers to a negative electrode potential with respect to a lithium metal reference (vs. Li/Li$^+$). The map information storage unit 503 may include a plurality of negative electrode potential estimation maps. The plurality of negative electrode potential estimation maps may be prepared according to the kind of the secondary battery assembly 101 (for example, the kind of positive and negative electrode active materials contained in the secondary battery assembly). The negative electrode potential estimation map can be created based on a predetermined test. For example, first, a plurality of test secondary batteries adjusted to different battery voltage values are prepared. Next, each of the test secondary batteries adjusted to each of the battery voltage values is disassembled to take out negative electrode plates. Each of negative electrode potentials is measured using each of the negative electrode plates, and a counter electrode made of lithium metal. From this measurement results, the correlation between the battery voltage and the negative electrode potential can be acquired, and thereby a negative electrode potential estimation map can be created.

The storage unit may include, for example, a basic information storage unit 504 that stores basic information of the secondary battery assembly 101, and a voltage storage unit 505 that temporarily stores the voltage (Vb) of the secondary battery assembly 101 during initial charging. Examples of the above-mentioned basic information include the kind of positive and negative electrode active materials contained in the secondary battery assembly 101, and the size of the wound electrode body.

A negative electrode potential estimation unit 506 is configured to estimate the negative electrode potential in the secondary battery assembly 101 during initial charging by referring to the negative electrode potential estimation map stored in the map information storage unit 503. At this time, the negative electrode potential estimation unit 506 refers to the voltage (Vb) of the secondary battery assembly 101 detected by the voltage detection unit 502.

A control unit 507 configured to control restraint of the secondary battery assembly 101 by the restraint jig 800 by cooperating with the voltage detection unit 502, the map information storage unit 503, the basic information storage unit 504, the voltage storage unit 505, and the negative electrode potential estimation unit 506. Furthermore, the control unit 507 is configured to control the series of charging and discharging of the secondary battery assembly 101 in the initial charging step S2 and other steps. The control unit 507 is connected to charging and discharging means and restraint force control means which are not shown. The charging and discharging means is conventionally known charging and discharging means that performs the series of charging and discharging of the secondary battery assembly 101 in the manufacturing method disclosed herein.

The restraint force control means is also connected to the restraint jig 800 and configured to be able to acquire information regarding the negative electrode potential of the secondary battery assembly 101 reaching 0.6 V and 0.3 V as will be described later. The restraint force control means performs controlling of a restraint force applied to the secondary battery assembly 101 from the restraint jig 800 based on the above-mentioned information. As an example, the restraint force control means is a hydraulic pressure supply pipe.

Restraining controlling by the control unit 507 will be described below. At the start of the initial charging of the secondary battery assembly 101, the above-mentioned basic information of the secondary battery assembly 101 is input to the control apparatus 500, and the negative electrode potential estimation map to be referred to is selected. Furthermore, as shown in FIG. 7, the restraint body 180 constituted of the secondary battery assembly 101 and the restraint jig 800 is constructed. Specifically, the flat plates 80 for restraint are disposed so as to face the entire large-area side walls 12b (refer to FIG. 1) of the battery case 10 (exterior body 12) of the secondary battery assembly 101, and the battery case 10 is sandwiched between the pair of the flat plates 80 for restraint. Then, the distance between the pair of the flat plates 80 for restraint is adjusted to apply a restraint force P0 to the secondary battery assembly 101. The magnitude of the restraint force P0 is set to 0 kN or more and 12 kN or less. That is, initial charging is started in a state where the secondary battery assembly 101 is restrained in the thickness direction (depth direction Y) of the wound electrode body 20 (restraint force P0>0 kN) or in a state where the secondary battery assembly 101 is not restrained (restraint force P0=0 kN). The charging rate for the initial charging is not particularly limited and may be appropriately set, but it can be 1 C or less, for example.

Figure 8:
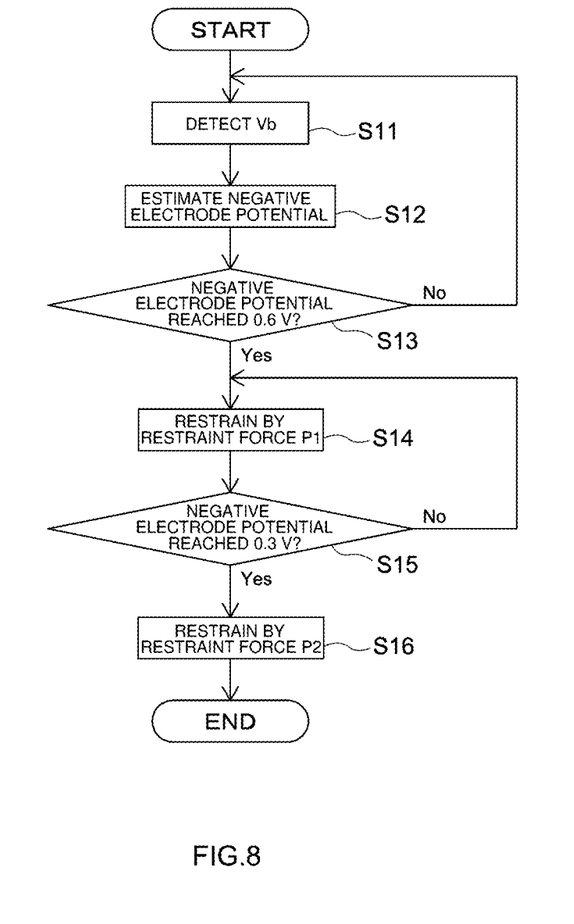
FIG. 8 is a control flowchart of the initial charging process in the manufacturing method according to the first embodiment.

As shown in FIG. 8, after the start of the initial charging (START), first, the voltage detection unit 502 detects the voltage (Vb) (step S11), and the voltage storage unit 505 stores this. Next, the negative electrode potential estimation unit 506 estimates the negative electrode potential of the secondary battery assembly 101 by referring to the negative electrode potential estimation map of the map information storage unit 503 and the voltage (Vb) stored in the voltage storage unit 505 (step S12). Herein, the control unit 507 determines whether the negative electrode potential has reached 0.6 V (step S13). When it is determined that the negative electrode potential has not reached 0.6 V (No), the step returns to step S11.

When it is determined that negative electrode potential has reached 0.6 V (Yes), the restraint force control means switches the restraint force P0 to the restraint force P1 and applies the restraint force P1 to the secondary battery assembly 101 (step S14). The restraint force P1 is larger than the restraint force P0 before the negative electrode potential reaches 0.6 V, and may be appropriately set within the range of 1 kN or more and 15 kN or less (preferably 3 kN to 15 kN, and more preferably 6 kN to 10 kN). The ratio of the restraint force P0 and the restraint force P1 (P0/P1) may be 0.3 or more, 0.5 or more, or 0.8 or more, for example. The upper limit of the above-mentioned ratio can be 0.9 or less, for example.

Next, the control unit 507 determines whether the negative electrode potential has reached 0.3 V (step S15). When it is determined that the negative electrode potential has not reached 0.3 V (No), the step returns to step S14. When it is determined that negative electrode potential has reached 0.3 V (Yes), the restraint force control means switches the restraint force P1 to the restraint force P2 and applies the restraint force P2 to the secondary battery assembly 101 (step S16). That is, the state in which the restraint force P1 is applied to the secondary battery assembly 101 is maintained until the negative electrode potential reaches at least 0.3 V. From the viewpoint of preventing plastic deformation of the battery case 10, the ratio (P2/P1) of the restraint force P1 and the restraint force P2 is preferably 0.8 or more and 1.2 or less, more preferably 0.9 or more and 1.1 or less, and further preferably 1.0 or more and 1.1 or less. As shown in a test example to be described later, the amount of gas generated becomes small after the negative electrode potential reaches 0.3 V. Therefore, switching to the restraint force P2 in step S16 is not essential. Alternatively, in step S16, restraint of the secondary battery assembly 101 may be released.

The temperature condition of the initial charging is preferably 45° C. or lower, more preferably 15° C. to 35° C., and further preferably 20° C. to 30° C. Furthermore, the level of charge of the secondary battery assembly 101 after the initial charging is preferably 5% or more, more preferably 10% or more, and further preferably 15% or more. The level of charge is preferably 50% or less, more preferably 40% or less, and further preferably 30% or less. Although not particularly limited, the initial charging step S2 may be performed in a state where the liquid injection hole 15 is open (that is, a state where the battery case 10 is open) in order to discharge gas generated due to the initial charging.

Although not particularly limited, as necessary, the secondary battery assembly may be left to stand for a predetermined time after the initial charging step S2 and before the following high temperature aging. Accordingly, gas retention in the wound electrode body 20 after the initial charging step S2 can be more effectively prevented. The above-mentioned predetermined time may be appropriately set within the range of 24 hours or longer and 336 hours or shorter. The temperature condition at this time may be appropriately set within the range of 5° C. or higher and 45° C. or lower, for example. Although not particularly limited, the secondary battery assembly 101 may be left to stand in a state where the liquid injection hole 15 is open (that is, a state where the battery case 10 is open). Furthermore, when the secondary battery assembly is left to stand as above, the secondary battery assembly may be restrained or may not be restrained.

As shown in FIG. 5, the high temperature aging step S3 is carried out after the initial charging step S2. First, charging is performed using the above-mentioned charging and discharging means so that the level of charge of the secondary battery assembly is 5% or more and 50% or less (preferably 15% or more and 40% or less), for example. The temperature condition at this time may be set to 45° C. or lower (preferably 20° C. or higher and 30° C. or lower), for example. The charging rate at this time is not particularly limited and may be appropriately set, but it can be 1 C or less, for example. In a case where the secondary battery assembly is restrained, restraint may be released at the start of charging in the present step.

Next, the secondary battery assembly is disposed in a high temperature environment while maintaining its level of charge to start high temperature aging. The temperature condition at this time is not particularly limited, and is preferably 50° C. or higher and 70° C. or lower (for example, about 60° C.), for example. In addition, the time for high temperature aging is preferably 5 hours or longer and 20 hours or shorter, for example. As described above, by carrying out the manufacturing method disclosed herein, a non-aqueous electrolyte solution secondary battery in a usable state can be manufactured.

EXAMPLES

Hereinafter, a test example relating to the present invention will be described. The contents of the test example described below are for explaining how the inventors of the present invention conceived the idea of the present invention, and are not intended to limit the present invention.

Construction of Secondary Battery Assembly

A lithium nickel cobalt manganese composite oxide (NCM) as a positive electrode active material, polyvinylidene fluoride (PVdF) as a binder, and acetylene black (AB) as a conductive material were weighed to make the mass ratio of NCM:PVdF:AB=98:1:1, and were mixed in N-methyl-2-pyrrolidone (NMP) to prepare a positive electrode slurry. This positive electrode slurry was applied to both surfaces of a long band-shaped positive electrode core (aluminum foil, thickness 18 µm) and dried. This was cut into a predetermined size and rolled by a roll press to obtain a positive electrode plate having positive electrode active material layers on the both surfaces of the positive electrode core. The density of the positive electrode active material layer was 3.4 g/cm$^3$, and the thickness of one surface was 110 µm. In addition, the length of the positive electrode plate in the longitudinal direction was 72 m, and the length in the width direction was 242 mm.

Graphite powder (C) as a negative electrode active material, styrene butadiene rubber (SBR) as a binder, and carboxymethyl cellulose (CMC) as a thickener were weighed to make the mass ratio of C:SBR:CMC=98:1:1, and were mixed in water to prepare a negative electrode slurry. This negative electrode slurry was applied to both surfaces of a long band-shaped negative electrode core (copper foil, 12 µm) and dried. This was cut into a predetermined size and rolled by a roll press to obtain a negative electrode plate having negative electrode active material layers on the both surfaces of the negative electrode core. The density of the negative electrode active material layer was 1.4 g/cm$^3$, and the thickness of one surface was 200 µm. In addition, the length of the negative electrode plate in the longitudinal direction was 80 m, and the length in the width direction was 252 mm.

Next, the positive electrode plate and the negative electrode plate produced above were laminated so that they face each other via a separator (separator sheet). This was wound in the longitudinal direction of the sheet to produce a wound electrode body as shown in FIG. 4. The above-mentioned separator had a base material formed of a porous layer made of polyolefin, and a heat-resistant layer containing alumina and a resin binder. The thickness of the above-mentioned base material was 16 µm, and the thickness of the above-mentioned heat-resistant layer was 4 µm. Furthermore, the heat-resistant layer was formed on the surface on the positive electrode plate side. In addition, the length of the separator in the longitudinal direction was 82 m, and the length in the width direction was 260 mm.

The dimensional relationship of the wound electrode body produced as described above is as follows.

W: 8 mm,
L1: 260 mm, and
H: 82 mm

Each reference numeral is as shown in FIG. 3. Specifically, W is the thickness of the wound electrode body 20. L1 is the width of the wound electrode body 20. H is the height of the wound electrode body 20.

Next, the wound electrode body and a lid body of a battery case were connected via a positive electrode current collector and a negative electrode current collector. This was inserted into a main body, and the main body and the lid body were welded to each other. Next, a non-aqueous electrolyte solution was injected through a liquid injection hole of the battery case (sealing plate). As the non-aqueous electrolyte solution, a solution, in which 1 mol/L of $LiPF_6$ as a supporting salt and vinylene carbonate (VC) as an additive (coating-forming agent) at a concentration of 0.3% by volume were dissolved in a mixed solvent containing ethylene carbonate (EC), ethyl methyl carbonate (EMC), and dimethyl carbonate (DMC) in a volume ratio of EC:EMC:DMC=30:40:30 (25° C., 1 atm), was used. In this manner, a secondary battery assembly for test was constructed.

Measurement of Amount of Gas Remaining in Wound Electrode Body

The non-aqueous electrolyte solution was further injected into the secondary battery assembly for test constructed as described above to fill the battery case with the non-aqueous electrolyte solution. In this state, a funnel was inserted into the liquid injection hole of the battery case. Next, the secondary battery assembly for test was restrained from both sides in the thickness direction with a pair of flat plates for restraint (refer to FIG. 7). A restraint force at this time was 0 kN (not restrained), 6 kN, or 10 kN. Next, charging was started at the current of 0.5 C under the environment of 25° C., a nitrogen atmosphere, and 1 atm. The liquid level in the above-mentioned funnel was observed from the start of charging until the level of charge (that is, SOC) was 12% with respect to a specified capacity of the secondary battery assembly for test. Then, a volume at which the liquid level rose was measured and used as the amount of gas remaining in the wound electrode body. The results are shown in FIG. 9.

Figure 9:
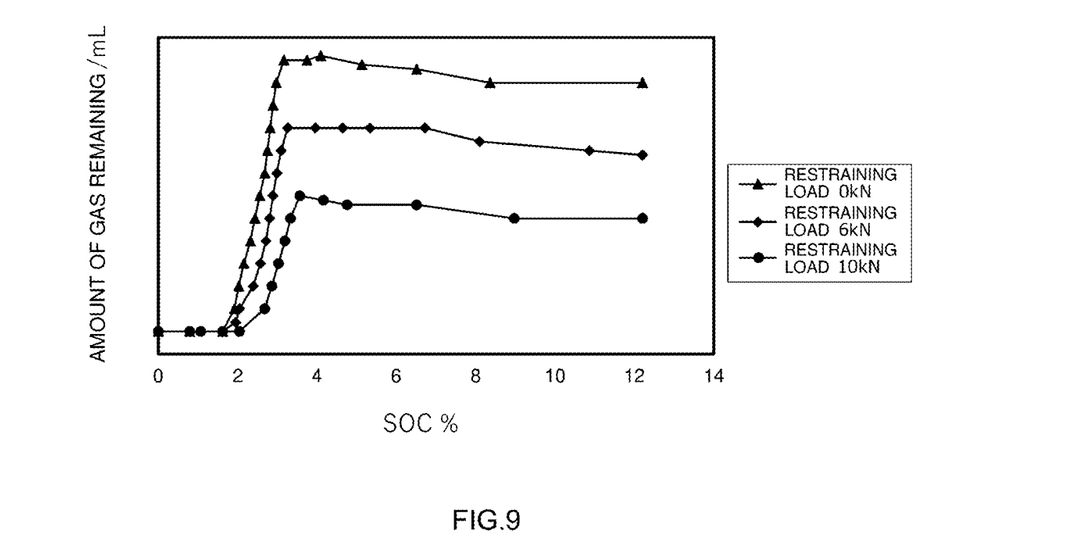
FIG. 9 is a graph showing results of a test example.

As shown in FIG. 9, it was found that gas was generated in the wound electrode body at the level of charge of at least 2% to 4% of the secondary battery assembly for test in any case of the restraint force of 0 kN, 6 kN, and 10 kN. In this secondary battery assembly for test, the negative electrode potential was 0.6 V to 0.3 V when the level of charge was 2% to 4%. From this, it was found that plastic deformation of the battery case can be more effectively prevented by applying a restraint force greater than a restraint force before the negative electrode potential reaches 0.6 V to the secondary battery assembly when the negative electrode potential reaches 0.6 V and maintaining this state until the negative electrode potential reaches at least 0.3 V. As shown in FIG. 9, the amount of gas remaining in the wound electrode body was reduced, as the restraint force was greater.

According to the technique disclosed herein, in initial charging of the secondary battery assembly, plastic deformation of the battery case can be prevented by applying a restraint force P1 greater than a restraint force before the negative electrode potential reaches 0.6 V to the secondary battery assembly when the negative electrode potential reaches 0.6 V and maintaining the state in which the restraint force P1 is applied to the secondary battery assembly until the negative electrode potential reaches at least 0.3 V.

In the non-aqueous electrolyte solution secondary battery 100 (refer to FIG. 1) manufactured by the above-mentioned method, plastic deformation of the battery case is prevented. That is, in the non-aqueous electrolyte solution secondary battery 100, a swelling amount D1 of the bottom portion 12a of the exterior body 12 is 0.3% or less of the length of the exterior body 12 in the height direction Z. Herein, the swelling amount D1 refers to the maximum amount of deformation of the bottom portion 12a toward a lower side D in the height direction Z with the peripheral edge portion of the bottom portion 12a as a reference (zero). In addition, a dent amount D2 of the large-area side walls 12b is 5% or less of the length of the exterior body 12 in the depth direction X. Herein, the dent amount D2 refers to the maximum amount of deformation of the large-area side walls 12b toward the inner side of the exterior body 12 in the depth direction X with the peripheral edge portion of the large-area side walls 12b as a reference (zero). Furthermore, a swelling amount D3 of the small-area side walls 12c is 0.1% or less of the length of the exterior body 12 in the width direction X. Herein, the swelling amount D3 refers to the maximum amount of deformation of the small-area side walls 12c toward the outer side of the exterior body 12 in the width direction Y with the peripheral edge portion of the small-area side walls 12c as a reference (zero).

Meanwhile, according to the studies by the inventors of the present invention, it was found that, in the aspect in which the length of the negative electrode active material layer 24a in the winding axial direction of the wound electrode body 20 is at least 20 cm, retention of gas in the center portion 201 of the wound electrode body 20 was more prominent, which makes it likely for uneven formation of a coating during initial charging to occur. In the initial charging, a high-quality coating (SEI coating) is formed on the surface of the negative electrode active material layer 24a. However, when gas is present between the negative electrode active material layer 24a and the separator 26, a charging reaction is unlikely to occur in this portion, which hinders formation of a coating. Gas is discharged to the outside of the wound electrode body 20 by the subsequent high temperature aging and the like. At a portion from which the gas is released (portion in which coating formation is insufficient), for example, a non-aqueous electrolyte solution component (for example, $LiPF_6$ as a supporting salt) and a negative electrode active material rapidly react with each other by a high temperature. Then, a non-quality coating having properties different from those of the above-mentioned coating is excessively formed.

In the above-mentioned manufacturing method, since gas retention can be prevented by predetermined restraint during initial charging, excessive formation of a non-quality coating can be prevented. This effect can be evaluated by performing laser ablation ICP mass spectrometry (LA-ICP-MS) on the negative electrode plate after high temperature aging. Specifically, for example, first, the non-aqueous electrolyte solution secondary battery after high temperature aging is charged (fully charged) to the level of charge of 100% at the current of about 0.5 C. Next, the non-aqueous electrolyte solution secondary battery is discharged to the level of charge of 0% at the current of about 0.5 C. Next, the non-aqueous electrolyte solution secondary battery is disassembled, and the negative electrode plate is cleaned with a cleaning liquid (for example, 100 vol % of dimethyl carbonate (DMC)) and dried.

Figure 10:
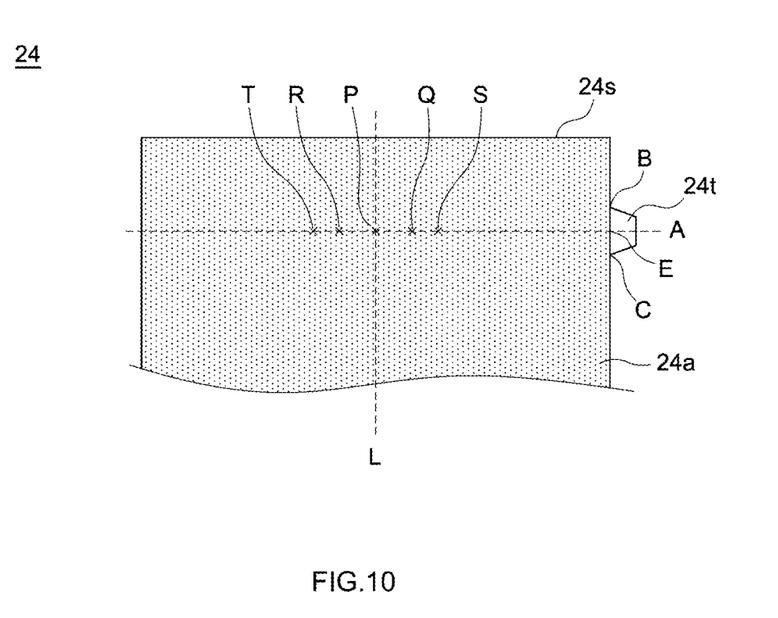
FIG. 10 is a partial plan view showing a negative electrode plate of the non-aqueous electrolyte solution secondary battery manufactured by using the manufacturing method according to the first embodiment.

For the negative electrode plate after drying, line analysis of phosphorus (P) is performed on the straight line A shown in FIG. 10 by LA-ICP-MS. As shown in FIG. 10, in the negative electrode tab 24t closest to a winding start end portion 24s in the negative electrode plate 24, one end portion of a base of the tab in a direction orthogonal to the winding axis (refer to FIG. 4) is defined as an end portion B. The other end portion on an opposite side to the end portion B is defined as an end portion C. A midpoint of a line segment BC linking the end portion B and the end portion C is defined as a midpoint E. A straight line passing through the midpoint E and along the winding axis is defined as a straight line A. An LA-ICP-MS apparatus is not particularly limited. For example, NWR213 (LA) of ESI and 7900 (ICP-MS) of Agilent Technologies, Inc. can be used in combination.

In addition, phosphorus (P) contained in the negative electrode active material layer 24a and collected from the following three points on the straight line A is detected by LA-ICP-MS:

(1) a center P of the negative electrode active material layer 24a in the winding axial direction,
(2) a point Q separated from the center P toward the negative electrode tab 24t by 5 mm or more and 15 mm or less (for example, about 10 mm), and
(3) a point R separated from the center P toward a side opposite to the negative electrode tab 24t by 5 mm or more and 15 mm or less (for example, about 10 mm).

In the non-aqueous electrolyte solution secondary battery 100 manufactured by the method disclosed herein, the intensity $I_1$ of phosphorus (P) at (1) is equal to or less than the intensity $I_2$ of phosphorus (P) at (2) ($I_1 \leq I_2$), and is equal to or less than the intensity $I_3$ of phosphorus (P) at (3) ($I_1 \leq I_3$). Both of the ratio ($I_2/I_1$) of $I_1$ and $I_2$ and the ratio ($I_3/I_1$) of $I_1$ and $I_3$ are preferably 1 or more (1.0 or more) and 2.5 or less, and more preferably 1 or more (1.0 or more) and 2.0 or less. The center P is an intersecting point of the straight line A and a center line L of the negative electrode active material layer 24a in the winding axial direction.

Furthermore, phosphorus (P) contained in the negative electrode active material layer 24a and collected from the following two points on the straight line A may be further detected by LA-ICP-MS:

(4) a point S separated from the center P toward the negative electrode tab 24t by 10 mm or more and 20 mm or less (for example, about 15 mm) (where the point S is on the outer side of the negative electrode plate 24 than the point Q), and
(5) a point T separated from the center P toward a side opposite to the negative electrode tab 24t by 10 mm or more and 20 mm or less (for example, about 15 mm) (where the point T is on the outer side of the negative electrode plate 24 than the point R).

At this time, regarding the intensity $I_4$ of phosphorus (P) at (4), and the intensity $I_5$ of phosphorus (P) at (5), the ratio ($I_4/I_1$) of $I_1$ and $I_4$ and the ratio ($I_5/I_1$) of $I_1$ and $I_5$ are both preferably 1 or more (1.0 or more) and 2.7 or less, and more preferably 1 or more (1.0 or more) and 2.0 or less. The positions of the points (2) to (5) can be appropriately set within the above-mentioned range according to the size of the negative electrode plate 24.

Hereinbefore, one embodiment of the technique disclosed herein has been described. The above-described first embodiment shows an example of the manufacturing method and non-aqueous electrolyte solution secondary battery to which the technique disclosed herein is applied, and is not intended to limit the technique disclosed herein. Hereinafter, other embodiments of the technique disclosed herein will be described. In the following description, a configuration substantially equivalent to the manufacturing method according to the first embodiment can be adopted except for the points particularly mentioned.

Second Embodiment

Figure 11:
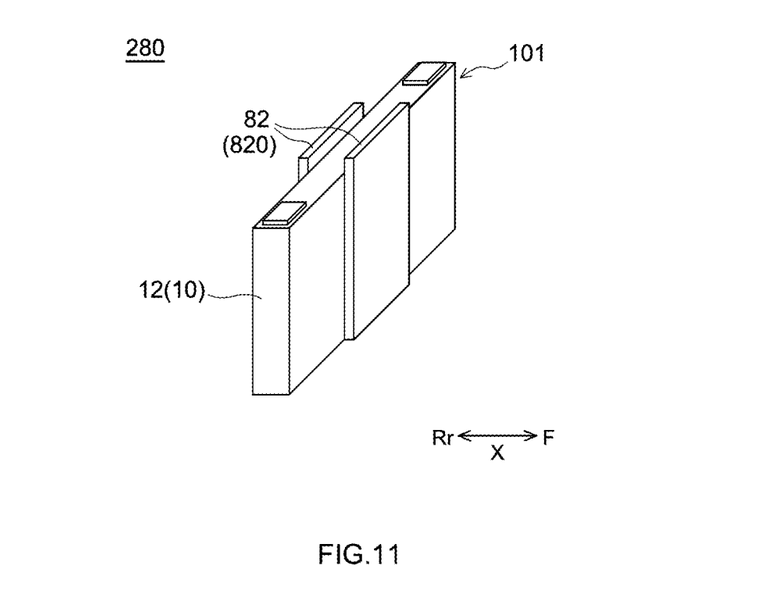
FIG. 11 is a perspective view for explaining a restrained state of a secondary battery assembly in a manufacturing method according to a second embodiment.

In the first embodiment, as shown in FIG. 7, the pair of the flat plates 80 for restraint are disposed so as to face the pair of the entire large-area side walls 12b (refer to FIG. 1) of the battery case 10 (exterior body 12). However, the shape, dimensions, and the like of the restraint jig are not limited as long as the effect of the technique disclosed herein is realized. For example, a restraint jig 820 including flat plates 82 for restraint as shown in FIG. 11 may be used. As shown in FIG. 11, the secondary battery assembly 101 is preferably sandwiched by the pair of the flat plates 82 for restraint in the depth direction X of the battery case 10 so that a predetermined restraint force can be applied to the center portion 201 of the wound electrode body 20 (restraint body 280). When the restraint jig 820 is used, a predetermined restraint force is applied to the center portion 201 of the wound electrode body 20, but a restraint force is not applied to the end portion 202 and the end portion 203. By selectively applying a restraint force to the center portion 201, gas retention in the center portion 201 can be more effectively prevented. The manufacturing method according to the second embodiment may be the same as the manufacturing method according to the first embodiment except that the restraint jig 820 is used.

Third Embodiment

Figure 12:
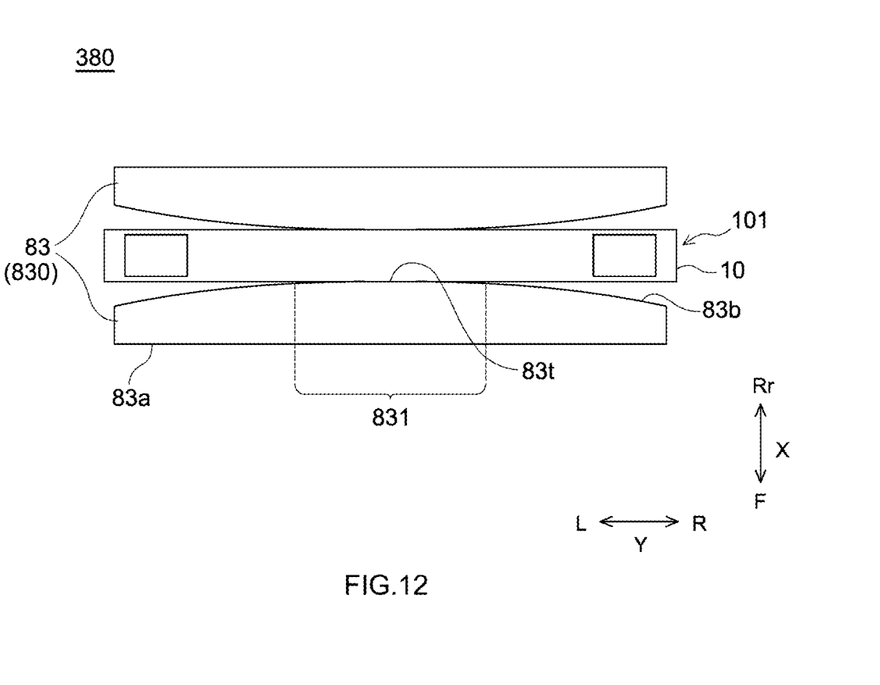
FIG. 12 is a top view for explaining a restrained state of a secondary battery assembly in a manufacturing method according to a third embodiment.

Alternatively, a restraint jig 830 including flat plates 83 for restraint as shown in FIG. 12 may be used. As shown in FIG. 12, the secondary battery assembly 101 is preferably sandwiched by the pair of the flat plates 83 for restraint in the depth direction X of the battery case 10 (restraint body 380). The flat plate 83 for restraint has a flat wide surface 83a and a curved surface 83b facing the wide surface 83a. The curved surface 83b faces the large-area side wall 12b of the battery case 10 and is curved toward the large-area side wall 12b. A restraint portion 831 including a curved apex 83t of the curved surface 83b is in contact with the large-area side wall 12b. The position of the curved apex 83t and the length of the restraint portion 831 in the width direction Y are not particularly limited, and can be appropriately set so that a predetermined restraint force is applied to the center portion 201 of the wound electrode body 20 by restraint. Portions of the curved surface 83b other than the restraint portion 831 are not in contact with the large-area side wall 12b. When the restraint jig 830 is used, a predetermined restraint force is applied to the center portion 201 of the wound electrode body 20, but a restraint force is not applied to the end portion 202 and the end portion 203. By selectively applying a restraint force to the center portion 201, gas retention in the center portion 201 can be more effectively prevented. The manufacturing method according to the third embodiment may be the same as the manufacturing method according to the first embodiment except that the restraint jig 830 is used.

Hereinbefore, although specific examples of the technique disclosed herein have been described in detail, these are merely examples and do not limit the scope of claims. The technique disclosed herein includes various modifications and alteration of the above-mentioned specific examples.

What is claimed is:

1. A manufacturing method of a non-aqueous electrolyte solution secondary battery that comprises
  a flat-shaped wound electrode body in which a band-shaped positive electrode plate and a band-shaped negative electrode plate are wound with a band-shaped separator interposed therebetween,
  a non-aqueous electrolyte solution, and
  a battery case accommodating the wound electrode body and the non-aqueous electrolyte solution,
the method comprising:
  assembling, in which the wound electrode body and the non-aqueous electrolyte solution are accommodated in the battery case to construct a secondary battery assembly; and
  initial charging, in which initial charging of the secondary battery assembly is performed, wherein
  in the initial charging,
the initial charging is started, with the secondary battery assembly restrained or not restrained in a thickness direction of the wound electrode body;
  when a negative electrode potential of the secondary battery assembly reaches 0.6 V with respect to a lithium metal reference (vs. Li/Li$^+$), a restraint force P1 is applied to the secondary battery assembly, wherein the restraint force P1 is greater than a restraint force applied before the negative electrode potential reaches 0.6 V;
  the restraint force P1 is applied to the secondary battery assembly until the negative electrode potential reaches at least 0.3 V with respect to the lithium metal reference (vs. Li/Li$^+$);
  a restraint force P2 is applied to the secondary battery assembly, when the negative electrode potential reaches 0.3 V with respect to the lithium metal reference (vs. Li/Li$^+$); and
  a ratio (P2/P1) of the restraint force P1 and the restraint force P2 is 0.8 or more and 1.2 or less.

2. The manufacturing method according to claim 1, wherein
  the restraint force P1 is 3 kN or more and 15 kN or less.

3. The manufacturing method according to claim 1, wherein
  the negative electrode plate comprises a negative electrode core, and a negative electrode active material layer formed on the negative electrode core, and
  a length of the negative electrode active material layer in a winding axial direction of the wound electrode body is at least 20 cm.

4. The manufacturing method according to claim 1, wherein
  an adhesive layer is provided on at least one surface of the separator, and the adhesive layer is adhered to the positive electrode plate or the negative electrode plate.

5. The manufacturing method according to claim 1, wherein
  the battery case comprises an exterior body comprising an opening and a bottom portion facing the opening, and a sealing plate for sealing the opening, and
  the wound electrode body is disposed inside the exterior body, wherein a winding axis is parallel to the bottom portion.

6. The manufacturing method according to claim 1, wherein
the battery case comprises a pair of large-area side walls facing each other, and a pair of small-area side walls facing each other and having an area smaller than an area of the large-area side walls,
a distance between the pair of large-area side walls is at least 3 cm, and
a plurality of the wound electrode bodies are accommodated in the battery case.

7. The manufacturing method according to claim 1, wherein
the non-aqueous electrolyte solution secondary battery comprises
a positive electrode current collector and a negative electrode current collector which are electrically connected to the wound electrode body, and
a positive electrode tab group comprising a plurality of tabs protruding from one end portion in a winding axial direction of the wound electrode body, and a negative electrode tab group comprising a plurality of tabs protruding from the other end in the winding axial direction, and
the positive electrode current collector and the positive electrode tab group are connected, and the negative electrode current collector and the negative electrode tab group are connected.

8. A manufacturing method of a non-aqueous electrolyte solution secondary battery that comprises
a flat-shaped wound electrode body in which a band-shaped positive electrode plate and a band-shaped negative electrode plate are wound with a band-shaped separator interposed therebetween,
a non-aqueous electrolyte solution, and
a battery case accommodating the wound electrode body and the non-aqueous electrolyte solution,
the method comprising:
assembling, in which the wound electrode body and the non-aqueous electrolyte solution are accommodated in the battery case to construct a secondary battery assembly; and
initial charging, in which initial charging of the secondary battery assembly is performed, wherein
in the initial charging,
the initial charging is started, with the secondary battery assembly restrained or not restrained in a thickness direction of the wound electrode body;
when a negative electrode potential of the secondary battery assembly reaches 0.6 V with respect to a lithium metal reference (vs. Li/Li$^+$), a restraint force P1 is applied to the secondary battery assembly, wherein the restraint force P1 is greater than a restraint force applied before the negative electrode potential reaches 0.6 V; and
the restraint force P1 is applied to the secondary battery assembly until the negative electrode potential reaches at least 0.3 V with respect to the lithium metal reference (vs. Li/Li$^+$), and wherein
both ends of the wound electrode body in the thickness direction are constituted of a wide planar portion,
the planar portion comprises a center portion including a center line in a winding axial direction of the wound electrode body, and two end portions sandwiching the center portion in the winding axial direction, and
in the initial charging, a restraint force is applied to the center portion, and a restraint force is not applied to the two end portions.

9. The manufacturing method according to claim 8, wherein
in the initial charging, a restraint force P2 is applied to the secondary battery assembly, when the negative electrode potential reaches 0.3 V with respect to the lithium metal reference (vs. Li/Li$^+$), and
a ratio (P2/P1) of the restraint force P1 and the restraint force P2 is 0.8 or more and 1.2 or less.

10. The manufacturing method according to claim 8, wherein
the restraint force P1 is 3 kN or more and 15 kN or less.

11. The manufacturing method according to claim 8, wherein
the negative electrode plate comprises a negative electrode core, and a negative electrode active material layer formed on the negative electrode core, and
a length of the negative electrode active material layer in a winding axial direction of the wound electrode body is at least 20 cm.

12. The manufacturing method according to claim 8, wherein
an adhesive layer is provided on at least one surface of the separator, and the adhesive layer is adhered to the positive electrode plate or the negative electrode plate.

13. The manufacturing method according to claim 8, wherein
the battery case comprises an exterior body comprising an opening and a bottom portion facing the opening, and a sealing plate for sealing the opening, and
the wound electrode body is disposed inside the exterior body, wherein a winding axis is parallel to the bottom portion.

14. The manufacturing method according to claim 8, wherein
the battery case comprises a pair of large-area side walls facing each other, and a pair of small-area side walls facing each other and having an area smaller than an area of the large-area side walls,
a distance between the pair of large-area side walls is at least 3 cm, and
a plurality of the wound electrode bodies are accommodated in the battery case.

15. The manufacturing method according to claim 8, wherein
the non-aqueous electrolyte solution secondary battery comprises
a positive electrode current collector and a negative electrode current collector which are electrically connected to the wound electrode body, and
a positive electrode tab group comprising a plurality of tabs protruding from one end portion in a winding axial direction of the wound electrode body, and a negative electrode tab group comprising a plurality of tabs protruding from the other end in the winding axial direction, and
the positive electrode current collector and the positive electrode tab group are connected, and the negative electrode current collector and the negative electrode tab group are connected.

* * * * *